United States Patent
Onufryk et al.

(10) Patent No.: US 7,334,071 B2
(45) Date of Patent: Feb. 19, 2008

(54) EXPANSION OF CROSS-DOMAIN ADDRESSING FOR PCI-EXPRESS PACKETS PASSING THROUGH NON-TRANSPARENT BRIDGE

(75) Inventors: Peter Z. Onufryk, Flanders, NJ (US); Tom Reiner, Carlsbad, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 274 days.

(21) Appl. No.: 11/138,853

(22) Filed: May 25, 2005

(65) Prior Publication Data

US 2006/0282603 A1 Dec. 14, 2006

(51) Int. Cl.
*G06F 13/14* (2006.01)
*G06F 13/36* (2006.01)
*G06F 3/00* (2006.01)
*G06F 13/10* (2006.01)

(52) U.S. Cl. .................. 710/312; 710/305; 710/306; 710/316; 370/401; 370/464; 370/902; 370/912

(58) Field of Classification Search ............... 710/312, 710/306, 311, 313–316, 62, 305; 370/351–352, 370/464, 401, 912, 902; 714/4; 718/1; 709/201, 709/223, 250, 253; 719/324; 711/203
See application file for complete search history.

(56) References Cited

U.S. PATENT DOCUMENTS

| | | | | |
|---|---|---|---|---|
| 5,761,448 A * | 6/1998 | Adamson et al. | ........... | 710/104 |
| 6,175,889 B1 * | 1/2001 | Olarig | ......... | 710/309 |
| 6,629,157 B1 * | 9/2003 | Falardeau et al. | ............. | 710/10 |
| 6,680,195 B1 * | 1/2004 | Patti et al. | ............... | 435/320.1 |
| 6,823,418 B2 * | 11/2004 | Langendorf et al. | ......... | 710/306 |
| 7,219,183 B2 * | 5/2007 | Pettey et al. | ................ | 710/316 |
| 2003/0005207 A1 * | 1/2003 | Langendorf et al. | ......... | 710/306 |
| 2006/0282603 A1 * | 12/2006 | Onufryk et al. | ............. | 710/312 |

OTHER PUBLICATIONS

"FX 1000: a high oerformance single chip Gigabit Ethernet NIC" by Ross et al. Publication Date:Feb. 23-26, 1997.*
Jack Regula, *Using Non-Transparent Bridging in PCI-Express Systems: Enabling Multi Processor Systems*, http://www.plxtech.com/products/pci_express/whitepapers/default.asp, 1 page, unknow date.
Jack Regula "Using Non-transparent Bridging in PCI Express Systems" Jun. 1, 2004, 31 pages.

* cited by examiner

*Primary Examiner*—Gopal C. Ray
(74) *Attorney, Agent, or Firm*—MacPherson, Kwok et al.

(57) ABSTRACT

A PCI-Express compatible switch is provided with two or more, internal virtual buses. In one embodiment, at least one of the plural virtual buses is designated as a special bus that is limited to having no more than 16 devices on it even though the protocol allows for more. In a supplemental or alternate embodiment, at least one virtual bus is limited to having no devices on it. A non-transparent bridge is provided on at least one of the special buses for providing cross-border routing of packets from one root domain to another root domain. The number-of-devices limitation placed on the special bus reduces the number of bits needed in a corresponding Device identifying field of a destination ID Tag to 4 or less, this integer number being smaller than the prescribed 5 bits called for by the PCI-Express standard for addressing the maximum of 32 devices per bus.

12 Claims, 7 Drawing Sheets

EXPANSION OF CROSS-DOMAIN ADDRESSING FOR PCI-EXPRESS PACKETS PASSING THROUGH NON-TRANSPARENT BRIDGE

FIELD OF DISCLOSURE

The present invention relates generally to routing of serial packets through networks. The invention relates more specifically to specific types of serial networking protocols where non-posted split transactions take place, such as in PCI-Express and PCI-X. The invention further relates to the use of a special type of bridge, known as a non-Transparent bridge within a PCI-Express or PCI-X network having plural domains.

DESCRIPTION OF RELATED ART

The PCI bus is a well known form of standardized signal interchange within the field of digital computer and communication system design. One lesser known extension of the PCI bus standard is referred to as PCI-X. An emerging, but not as yet, well known extension of these is referred to as PCI-Express. The three should not be confused with one another. The present disclosure is mostly directed to the industry-defined, PCI-Express protocol but can also be applied to the older, PCI-X protocol. Both of the latter protocols include use of a type of data exchange known as a non-posted split transaction.

PCI-Express is characterized by its use of high speed serial links and of packets structured to move through such high speed serial links. Like other communication standards, the PCI-Express protocol has a layered architecture that includes (1) a Physical signaling layer, (2) a Data link layer and (3) a Transaction layer. The Physical signaling layer of PCI-Express is typically characterized by use of a Low-Voltage Differential Signaling (LVDS) high-speed serial interface specified for 2.5 GHz or higher signaling, while further using 8B/10B or like link encoding and using AC-coupled differential signaling. A complementary set of LVDS pairs is called a lane. The PCI Express standard allows for lane combinations so as to form wider communication ports (or links), designated as ×1, ×2, ×4 and so on up to ×32. Thus multi-lane links can provide higher bandwidth than can a comparable single lane link. The Data link layer of the PCI-Express protocol is typically characterized by packet exchange standards that govern how packets route between neighboring PCI Express entities and over the single or multi-lane highways while assuring data integrity and providing for sequence checking, along with packet acknowledgments and flow control. The Transaction layer of the PCI-Express protocol is typically characterized by standardized rules for translating data read and/or write requests as they move through switching nodes between an intelligent host and one or more endpoint devices.

There is much to the PCI-Express standard that is beyond the scope of the present disclosure. More information about the standard may be obtained via the internet from the PCI Special Interest Group at: http://www.pcisig.com/specifications.

The PCI-Express standard was initially designed for a single host environment, meaning that it was originally structured to have only one, intelligent host (i.e. a microcomputer or CPU) interfacing with a plurality of less intelligent endpoint devices such as memory units and wired or wireless communication ports. The host was expected to be the one "root" of the PCI-Express network hierarchy tree, while the rest of the tree was formed of branches made of serial links, bridges and switches that provide signal routing (packet routing) between the host and an array of subservient, endpoint devices hanging off the branches as leaf nodes. However, soon after the PCI-Express standard was adopted; the industry developed a desire for multi-host networks. In other words, rather than having a single host or "root", designers found it desirable to have multiple intelligent hosts interconnecting with one another and with the various, endpoint devices of the different roots. PCI-Express was not designed for that. (Note: Although the hosts are referred to herein as being "intelligent" that does not inferentially mean that other devices in the communications system; i.e., switches, have no or lesser intelligence. The various network devices may include programmable processors and software and/or firmware executing in those processors as appropriate.)

A solution to the multi-host problem came with the use of something called a Non-Transparent Bridge (also "NtB" herein). A company known as PLX Technology Inc. (Sunnyvale, Calif.) is credited with introducing the use of non-transparent bridges to the PCI-Express community for handling inter-domain communications. The functional behavior of the NtB in a PCI-Express network is substantially identical to that of Non-Transparent Bridges as commonly used in PCI and PCI-X systems. Its use in PCI-Express networks quickly became popular. Without going into too much detail just yet, the NtB is positioned at the intersection of two separately-rooted trees and it appears as an endpoint device to each of the intersecting trees. (Some of this terminology will become clearer when FIG. 1 is described. For now, one can picture two trees having a corresponding two branches connecting to a same endpoint. Metaphorically speaking, they share a same leaf.)

Different types of addressing methods can be used in PCI-Express, including one that relies on so-called, ID-Tags. Another of the used addressing methods relies on a so-called, BAR (base address register) and an offset. The ID-Tag based, addressing system creates problems when packets have to cross from a first tree (a domestic tree) into a second tree (a foreign tree) and then come back across the border again as part of something called a split transaction. Bus numbers are generally different in the two trees. A forward translation should be (but does not always have to be) performed on the ID-Tags when a packet crosses from a domestic tree into a foreign tree. Otherwise the border-crossing packet may be designating wrong bus and device numbers when it is on the foreign side of the border. During a split transaction, a reverse translation has to be (not optional) performed on a return packet that is heading back to a request originator in the domestic tree, but is coming in from a foreign tree. If this is not done, the return packet may be designating wrong bus and device numbers as the address for its return-trip target. It is supposed to return to the original requestor of the split transaction.

According to the PLX approach, memory space is reserved by the NtB for storing the correct ID-Tags for domestic side originators of certain types of requests (split transactions). These stored ID-Tags are fetched by return-trip packets (completion packets) as they make their way back into the domestic side of a border crossing. No more than 8 originators can be specified under the PLX approach for a reason that will become clear momentarily. As a request first crosses the border, an ID Tag that addresses the NtB as its target (it does not address the request originator) is stored in a translation mapping table. A 3-bit wide data field inside the stored ID-Tag, which field is known as the "Function" field, is specially set by software of the Non-Transparent Bridge to point to a pre-stored, other ID-Tag. That pre-stored, other ID-Tag holds the correct bus and device numbers of the one of the up to eight domestic devices that are allowed to be originators of cross-border split transactions. When a cross-border non-posted, split transaction (e.g., a memory read) is initiated by one of the maximum-of-8 originators, the originator targets the NtB as the endpoint device in a correspondingly output, completer ID-Tag. The targeted NtB sets the 3-bit Function field to indirectly point back to the originator. (The targeted NtB also addresses the foreign or over-the-fence device that is to be the true completer with the use of BAR-style addressing.) The receiving NtB is further programmed to understand that the so-set Function field is to serve as an index pointing to the pre-stored ID-Tag of the request originator. This happens while the corresponding first part (the requesting part) of a split transaction is crossing through the NtB border from the domestic side and towards the foreign-tree side. When it gets to the foreign side, the request is translated (remapped) by the NtB so that the translated request can be correctly routed to the targeted slave device (e.g., the foreign memory whose data is to be read).

It is the storing of the specially modified, 3-bit Function field on the domestic side of the NtB that later allows a completion response transaction (the second part of the split transaction) to come back from the transaction-completing device (slave) in the second, foreign PCI Express tree and to cross through the NtB border and to be correctly, re-translated on the domestic side in such a manner that "originator" ID Tags in the response packets will correctly point to the proper request originator (or master) in the domestic or first PCI Express tree. Thus one device in a first PCI Express tree (domestic tree) can send split-transaction requests to an over-the-border device in a second PCI Express tree (foreign tree) and the domestic requestor can correctly get back the completion response, as required by the PCI-Express protocol.

Aside from the 3-bit Function field, each ID Tag further contains an 8-bit "Bus" identifying field and a 5-bit "Device" identifying field. The PCI-Express protocol permits a maximum of 32 devices on each PCI-e bus and a maximum of 256 buses in a PCI-e tree.

PCI-Express networks continue to grow in size and complexity. It is expected that a need will arise for sending split transaction requests across domain walls (over-the-border, so to speak) by more than just eight domestic devices (originators). However, the standardized 3-bit size of the Function field in the ID Tag limits the above PLX approach to being able to uniquely pre-designate no more than $2^3=8$ domestic devices as having permission to originate cross-border, split transactions.

SUMMARY

Structures and methods may be provided in accordance with the present invention for overcoming the above-described problem.

More specifically, in accordance with one aspect of the present disclosure, a PCI-Express compatible switch is provided with two or more, internal virtual buses. At least one of the plural virtual buses is designated by the switch's software or by other means as a special bus that is limited to having no more than 16 devices ($=2^4$ devices) on it. In one embodiment, the at least one special virtual bus is limited to having just one device ($=2^0$ devices) on it, namely, a non-Transparent bridge that provides connection from a first PCI Express tree to a second PCI Express tree. The stated limitation of allowing no more than 16 devices to reside on each special bus reduces the number of bits needed in the "Device" identifying field of a corresponding ID Tag to 4 or less, this integer number being smaller than the protocol-prescribed 5 bits for the Device-number field. As a result, unused bits within the 5-bit Device field are freed for other use. One of the other uses contemplated by the present invention is to extend beyond 8, the number of domestic devices that can serve as originators of cross-border split transactions that move across such a specially-structured non-Transparent bridge (NtB). If only one device (one NtB) is allowed to reside on a given special bus of the switch, then all 5 bits of the Device identifying field will be freed for other use because the corresponding, special virtual bus has $2^0$ devices on it. In such a case, the maximum number of domestic devices that can initiate over-the-fence, split transactions (e.g., memory reads from foreign devices) will increase from $2^3=8$ to $2^8=256$ devices (assuming all the bits of the Device field and the Function field are used for performing ID-Tag translation in the completion-direction). This is quite a substantial expansion of the cross-domain sourcing options allowed for PCI-Express packets passing through a non-transparent bridge between a domestic tree and a foreign tree.

In accordance with a supplemental or alternate aspect of the present disclosure, a PCI-Express compatible switch is provided with one or more, internal and unused virtual buses (dummy buses) that sequentially bridge to a non-dummy bus on which there resides a nontransparent bridge. One or more bus-identifying bits of an ID-Tag that targets the nontransparent bridge are designated as don't-cares for purposes of addressing the nontransparent bridge if the one or more bus-identifying bits merely distinguish between the dummy bus(es) and the non-dummy bus on which the nontransparent bridge resides. The one or more bus-identifying bits that are so-designated as don't-cares are then freed for other uses, including for identifying domestic originators of cross-border, split transactions. The dummy bus(es) method may be used alone or in combination with the above, special bus(es) method to increase the number of domestic devices that can be identified as originators of cross-border, split transactions.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
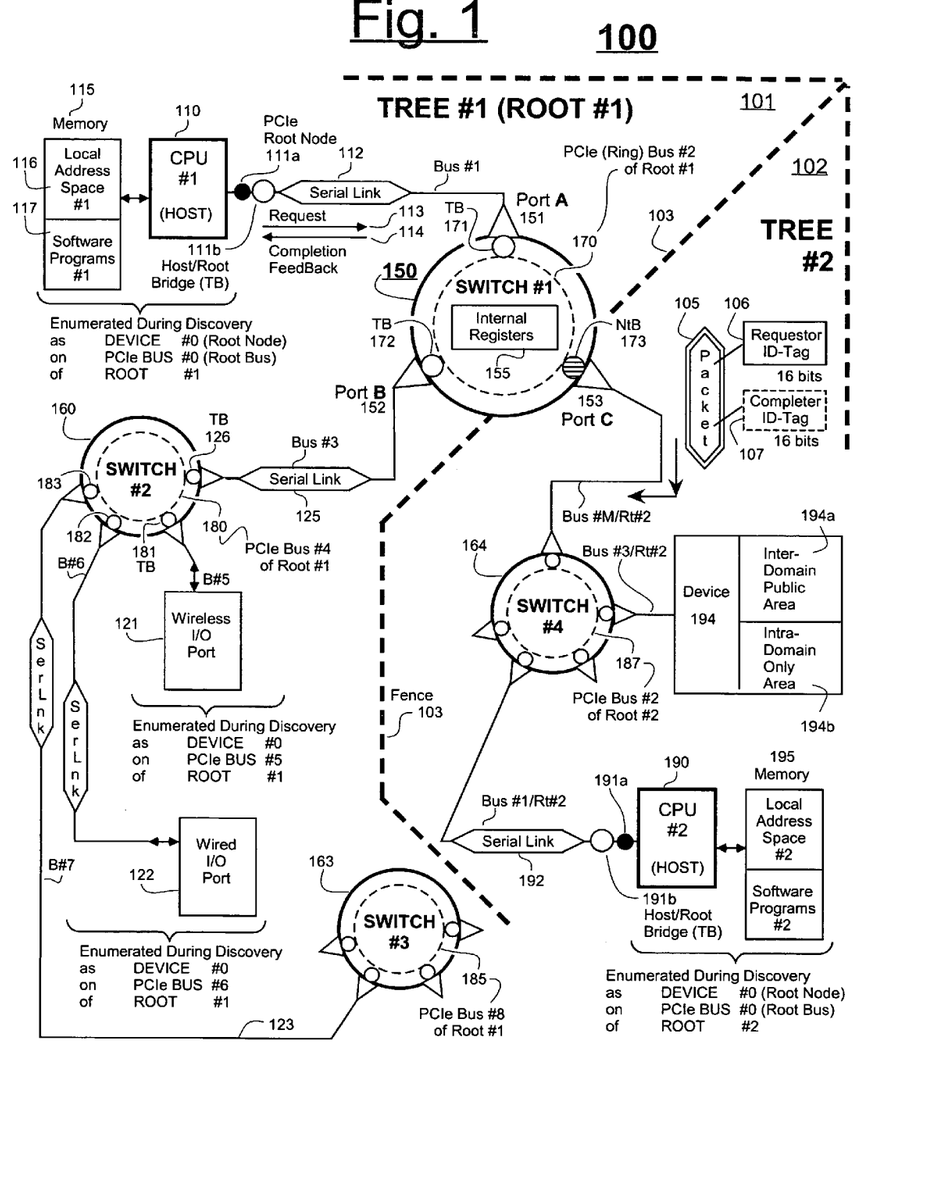
FIG. 1 is a schematic diagram showing a multi-domain PCI-Express network and showing a possible enumeration within each of the domains.

FIG. 1 is a schematic diagram showing a PCI-Express based communications system 100 comprising a first rooted tree 101 (hereafter also the domestic tree) and a second rooted tree 102 (hereafter also the foreign tree). Dashed boundary line 103 represents a logical border or fence between the two communication trees. Line 103 is also referred to as a domain wall. A non-transparent bridge (NtB 173) straddles the fence 103 between the two trees and thereby allows data exchange between the two trees, 101 and 102.

Those skilled in the art will quickly recognize from FIG. 1 that CPU 110 (also designated as CPU#1) serves as the root host of tree 101 while CPU 190 (also designated as CPU#2) serves as the root host of tree 102.

The hosts can be independently powered up or rebooted at various times. When a given host boots up and executes various initialization procedures, one of the procedures it should perform is to investigate the current state of its respective communications tree. During the investigation, it carries out a process known as bus enumeration. Simply put, the host (CPU#1 or CPU#2) will scan outwardly from its root node (111a or 191a), moving in a generally downstream direction through the lower branches and nodes of its respective PCI-based tree, 101 or 102. It will successively assign unique bus numbers to the various, operative buses it encounters. (Devices on each operative bus are pre-numbered before bus enumeration occurs.) Some buses may be inoperative because power has been turned off to them or for other reasons. Thus a same physical bus is not necessarily assigned a same bus number during each of successive enumerations. With each completed bridge crossing during the enumeration scan, the investigation is brought to yet a new operative bus that is to be uniquely enumerated and checked to see what devices reside on that new bus.

In terms of a more concrete example, note that tree 101 contains a host/PCI Bridge 111b coupling CPU#1 (item 110) to serial link 112 by way of node 111a. The node 111a near where the CPU#1 connects to the host/PCI Bridge 111b may be considered part of a bus number zero (Bus#0) within the first PCI Express tree 101. Link 112 is a PCI-Express serial link that joins bridge 111b (and also the host CPU 110) to a corresponding serial port A (151) of a first PCI-compatible switch 150 (also referenced as Switch#1). This first serial link 112 may be enumerated as Bus #1 of the tree 101.

A second bridge, namely, a transparent bridge, TB 171, is found to join the serial link side of port A to a virtual bus 170 within the first switch 150. This second-discovered, and non-root bus of the enumeration scan may be enumerated as Bus#2 of Root#1. (CPU#1 may be programmed to assign a number other than #2 to the switch-internal, virtual bus 170. It is understood that this is just an example.)

Moving along the found bus 170, the boot-up scan may come across a third transparent bridge 172 linking to serial port B (152) of the first switch. This port B may be linked as shown, by an operative second serial link, 125 to a further serial port of a second PCI-compatible switch 160. The second serial link 125 may be designated as Bus#3 of Root#1 during the enumeration process. Upon crossing the illustrated transparent bridge 126 within switch 160 (Switch#2), the scan will find yet a third bus 180, namely, a virtual PCI bus provided within Switch#2. This uncovered bus may be enumerated as PCIe Bus#4 of Root#1. Continuing around bus 180, the enumeration scan should also discover transparent bridges 181, 182 and 183. The corresponding buses on the other sides of those bridges may be respectively enumerated as B#5, B#6 and B#7. As a result of this enumeration, the wireless I/O port device 121 that resides on the other end of serial bus B#5 will be enumerated as Device#0 of PCIe Bus#5 of Root#1. Similarly the wired I/O port device 122 at the other end of serial bus B#6 will be enumerated as Device#0 of Bus#6 of Root#1. Not all buses within the system have to be serial ones. The system may also include PCI or PCI-X buses which are assigned respective bus numbers during enumeration and these buses may have respective numbers of devices on them as well as bridge or switch connections to yet further extensions of the PCI Express tree.

The scan of the first PCI-Express tree 101 may continue downstream in the above described manner, next finding virtual bus 185 for example inside switch 163 (Switch#3) and so on. The specific paths which the enumeration scan takes and the specific bus and/or device numbers which are assigned to each uncovered entity can vary from enumeration run to enumeration run. The enumeration-assigned bus and pre-assigned device numbers may remain private within a local memory 115 of the first CPU 110. (Typically, a device at the end of a serial link is assigned as Device #0 under PCI Express rules. Devices residing on a virtual bus can have higher device numbers, i.e., #1, #2, etc.) Aside from assigning bus numbers to the various entities found in the network, CPU#1 (host 110) may further assign local, BAR-style addresses (with offsets) to these various devices, which addresses may be stored in a local address space defining area 116 of memory unit 115. Software programs 117 of the first CPU 110 may rely on using either the bus and device number designations assigned to each entity or the local BAR-style addresses assigned to each entity depending on the type of communication accesses that will be performed (i.e., message or memory mapped accesses). The PCI-express protocol is expected to support both types of addressing. In particular, when so-called, completion transaction packets come back from a slave or "completer" device, the PCI-express protocol requires that the bus and device number designations be used for returning the completion data to a requesting master (request originator). As already explained above, a problem arises when the completion data has to cross over a border separating two trees (e.g., the originator's domestic tree and the foreign tree where the completer resides).

In the example of FIG. 1, host device 110 will have come across; during its discovery and enumeration process, non-transparent bridge (NtB) 173, which bridge is shown connected to Bus#2 (170) of Switch#1 (150). The discovery scan will not cross that nontransparent bridge 173 to see what is on the other side of serial Port C (153). Instead the scan will designate NtB 173 as being an endpoint device of the local tree 101. In the illustrated example, NtB 173 is the only endpoint device on Bus#2 and therefore it will be designated as Device#0 of enumeration-designated Bus#2 of Root#1. Bus#2 could have had as many as 31 additional devices (i.e., NtB's) residing on it. NtB 173 could have instead been discovered to be one of a hypothetical further set of Device#1- Device#31 on Bus#2. Note that the NtB 173 could instead have been located on Bus#4 within switch 160 or on Bus#8 within switch 163. It is merely for sake of simplified example that NtB 173 is shown to have been located on a virtual bus, which by happenstance was enumerated as Bus#2 of Root#1.

When the host of the second tree 102 awakens and conducts its respective discovery process, it too will follow a similar protocol moving, downstream from its respective root node 191a through various bridges, buses, switches, etc. to discover endpoint devices at the ends of various buses in its domain. Device 194 may therefore be found as having been pre-assigned with a given device number #X and as residing on a bus that was enumerated as Bus#3 of Root#2. The NtB 173 of Switch#1 may be designated as a given endpoint device, with pre-assigned device number #Z and residing on enumerated Bus#M of Root#2. In other words, host 190 (CPU#2) can and generally will assign a bus number to NtB 173 that is independent of what bus number was assigned to NtB 173 by host 110 (CPU#1). It is therefore seen, that the same common device, NtB 173 can be enumerated to have a different bus number from the viewpoint of each of the PCI Express trees, 101 and 102 to which it jointly connects. As was the case with the first host, the second host 190 (CPU#2) has its own local memory 195 in which it stores local address designations and executable programs. Its software programs (#2) can use either the local BAR-style address designations or local device and bus numbers to identify various devices with which that software interacts. Just as was the case with the first tree 101, a problem will develop for tree 102 when completion packets cross through a non-transparent bridge (173 or another) and those packets are required to identify an originator device within tree 102 by means of bus and device numbers. Bus numbers on one side of the border 103 are generally not valid on the other side of the border.

There is an additional aspect of the PCI-express protocol worthy of mention here. Various devices within each domain may have a public area 194a which is designated (mapped in the NtB) as being publicly accessible to devices from a foreign domain as well as to devices within its own domestic domain. The device memory may also have an intra-domain only area 194b which has been mapped as being private to the local domain and not accessible by devices in one or more other domains. Thus, CPU#1 (110) may ask for a memory read transaction which attempts to read contents from within the inter-domain public area 194a of the second root tree 102, but that CPU#1 will not be allowed to successfully complete an attempted read of memory contents within private area 194b. The PCI express protocol includes a transaction completion sequence which indicates to a requester (e.g., CPU#1) whether a specified transaction (e.g., read memory of device 194) has been completed or not and who completed it. Not all interactions between a requesting master and a responding slave require the return of a transaction completion message. One of the interactions that does call for such a completion feedback is the memory read transaction.

Assume that CPU #1 (110) wishes to perform a read of memory area 194a. CPU 110 will send out a request signal 113 by way of bridge 111b and serial link 112 into serial Port A of switch 150. The corresponding request-carrying packet(s) will be routed across transparent bridge 171, onto bus 170, and from there into nontransparent bridge 173. As they move through NtB 173, the request packets will have to undergo an address translation process because addresses used on the tree #1 side of the domain fence 103 are not valid on the tree #2 side of the same fence. NtB 173 must maintain some sort of translation map for domain-crossing packets to allow for proper translation of addresses as packets move back and forth across the fence 103. The translation map will be stored among internal registers 155 of the corresponding Switch#1. These internal registers 155 can be manipulated by the respective hosts in accordance with PCI-Express standards so that appropriate address translations may take place.

More specifically, in accordance with the above-mentioned PLX approach, one of the translations will involve the pre-storing (during initialization) of the domestic bus and device numbers of up to 8 request originators within tree 101, where the pre-stored information is stored in a corresponding maximum number of 8 internal registers within memory region 155 of the switch 150. Further in accordance with the above-mentioned PLX approach, one of the translations will involve setting the 3-bit Function code of a request-side ID Tag to serve as an index pointing to the storage location of the saved bus and device number of a request originator. Later, when a completion transaction packet comes back from a foreign completer (i.e., 194), the saved 3-bit Function code is fetched and used to retrieve from registers area 155, the correct bus number and device number of the request originating master. The so-retrieved bus and device numbers are written into foreign-wise sourced completion packets (into requestor ID Tags within those packets) so that they will route back to the correct request originator within Tree#1 (101).

One border-crossing packet is symbolically shown at 105. It includes a first ID tag 106 which identifies the transaction requester and a second ID tag 107 which typically identifies the transaction-completing device (i.e., 194). The second ID tag 107 is typically not filled with valid identification data until after a specific completing device (i.e., 194) has completed the requested function (i.e. a data read). Each of ID tags 106 and 107 is 16-bits wide and is subdivided into an 8-bit Bus field, a 5-bit Device field and a 3-bit Function field. (See item 257 of FIG. 2.) When packet 105 is on the Root#2 side (102) of border 103, its ID tags (106, 107) should be using bus and device numbers (if filled in) that are valid on the Root#2 side. Similarly, when packet 105 is on the Root#1 side (101) of border 103, its ID tags (106, 107) should be using bus and device numbers that are valid on the Root#1 side. When packet 105 crosses from the Root#1 side (101), through NtB 173 and into the Root#2 side (102) of the border, the request-originator ID tag, 106 has to be modified. In so far as the Root#2 side is concerned, NtB 173 will become the new origination point of the forward moving request. The Root#2 side does not recognize the bus and device numbers of CPU#1.

ID-Tag translation does not pose a problem for request-forwarding portions of split transactions. This is so because the request-forwarding portions can use BAR-style offset addressing to identify the targeted completer device (slave device). However, when the completion-return portion of a split transaction takes place, the PCI-Express protocol requires that the ID-Tag style of addressing be used. This is where the problem lies. The ID Tag of the Root#1 originator (say device 110) has been lost in the translation, so to speak. According to the PLX solution, a saved 3-bit Function code is used to retrieve from memory 155, the otherwise lost ID Tag of the Root#1 originator. Therefore, under the PLX approach, split transactions can be performed only by a limited number in each tree of no more than 8, pre-designated originators that have been initially designated to perform such cross-border, split transactions.

In the illustrated example, after the requested memory read is successfully performed on area 194a, the PCI-express protocol requires the access-granting device, 194, to fill in its ID-Tag into area 107 of return packets and to send the transaction completion packets (completion feedback 114) back to the request originator. Device 194 will think that NtB 173 is the request originator. Therefore, device 194 will fill in the Root#2 bus and device numbers of NtB 173 into the originator area 106 of the return packets. In the illustrated example, the transaction completion packets will traverse Bus#3 of Root#2 and then cross over a bridge to get onto bus 187 of Switch#4. Switch#4 will then route the transaction completion packets 114 onto Bus#M of Root#2 so that the routed packets will reach port C (153) of switch 150. At this stage, the routed packets 114 will hit their Root#2 endpoint device, namely, NtB 173. Within NtB 173 a retranslation will occur, converting the addressing protocol used on the Root#2 side of the fence 103 back to the addressing protocol used on the Root#1 side of fence 103. When the completion feedback signal 114 reaches the request-originating device (i.e. CPU 110), the requestor will be informed as to whether the requested operation has been successfully completed or not, and if yes, what data was obtained.

Although FIG. 1 shows just PCI serial links and only one nontransparent bridge 173 within Switch#1, the networked system 100 does not have to be structured so simply. By way of example, multiple nontransparent buses may have been provided within switch 150 and on its internal virtual PCI bus 170. In such a more complex case (not shown) each of the plural NtBs will have been pre-assigned a different device number although they all sit on the same virtual bus 170. The PCI-Express standard allows for as many as 32 devices on each PCI-Express bus. Thus the ID-Tag Device fields each have 5 bits to accommodate the 32 maximum devices allowed by the PCI-Express standard. Additionally, the networked system 100 may have been modified to include a mixture of standard PCI buses and/or PCI-X buses rather than just the illustrated PCI-express type of serial buses, in which case multiple devices may sit on each of the standard PCI or PCI-X buses and these would need to be assigned with their respective spectrum of allowable device numbers per the standard PCI protocol.

Figure 2:
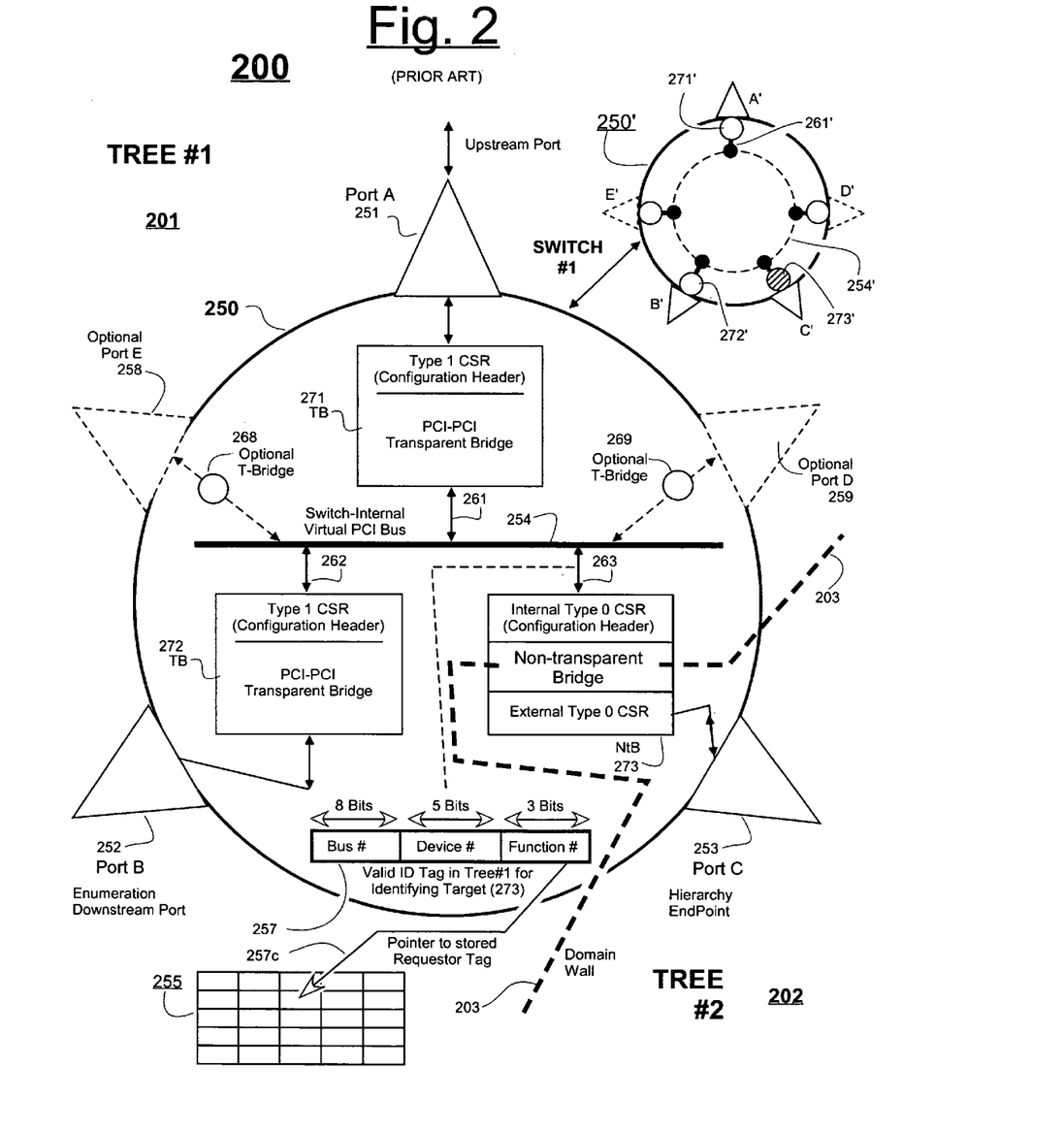
FIG. 2 is a schematic diagram showing a conventional, multi-port switch that includes a non-Transparent bridge (NtB)

Referring to FIG. 2, an exploded view is provided of a conventional, PCI-express compatible switch 250 that contains two transparent bridges 271-272 as well as one non-transparent bridge, 273 where the latter bridge straddles the fence 203 between PCI Express trees 201 and 202. The switch 250 has a respective set of at least three serial communication ports 251-253 designated as port A, port B and port C, where port A (251) is the upstream port for the Root#1 tree and port C (253, or more correctly, NtB 273) is considered an endpoint node (tree endpoint) for each of the respective PCI Express trees (201 and 202) that it joins to. Although the solid triangle symbols indicate that switch 250 is a three ported device, it is possible to have switches with many more such ports as is indicated by dashed-triangle symbols 258 and 259. Although virtual bus 254 is shown to have 3 bridges connected to it (271, 272, 273), it is possible to have switches with many more such bridges. Dashed connections are thus shown for optional bridges 268 and 269. Optional bridges 268 and 269 do not have to be transparent bridges. They can be nontransparent ones. (See for example, FIG. 3A where corresponding optional bridge 368 is hatch-filled to indicate it is a non-transparent bridge.)

To assist in understanding of the basic structure of switch 250, a symbolic icon is correspondingly shown at 250' in the upper right corner of FIG. 2. Transparent bridges (i.e., 271' and 272') are shown as white-filled circles having solid circumferences. Non-transparent bridge 273' is shown as a hatch-filled circle. The switch-internal, virtual PCI bus 254' is shown as a dashed circle. This iconic representation corresponds with that used for Switch#1 (150) of FIG. 1.

When PCI-Express packets are routed through switch 250 (FIG. 2), the packets will travel from one port to another by passing through the internal virtual PCI bus 254. As seen, transparent bridge 271 links port A (251) to the internal virtual bus 254 by way of connection 261, transparent bridge 272 connects port B (252) to the internal virtual bus 254 by way of connection 262, and in similar fashion, nontransparent bridge 273 connects port C (253) to the internal virtual bus 254 by way of connection 263. Those skilled in the art will appreciate that transparent bridges 271 and 272 may be characterized as using Type-1 configuration headers (CSR's) and that the nontransparent bridge 273 may be characterized as using Type-0 CSR headers for both its switch-internal and switch-external connection sides. (The Type-1 and Type-0 CSR designations correspond to different register structures which are accessed by switch-internal software to carry out various switching operations.) Also, it will be appreciated that when the request portion of a non-posted split transaction moves through connection 263, moving from communications Tree #1 to Tree #2 (across domain wall 203) the transaction requesting packet will drop off in a mapping table (not shown) of the switch, a copy of a request-side ID tag 257 that identifies NtB 273 as an intermediate target of the request, where the 8-bit Bus-number field contains the Root#1 enumeration-assigned bus number of bus 254 and the 5-bit Device-number field contains the Root#1 pre-assigned device number of NtB 273. The 3-bit Function-identifying field will have been filled in with an index 257c that points to a register in memory table 255, where the pointed-to register holds the Root#1 bus and device numbers of the request originator, i.e., CPU#1. Thus the Function field in the target ID-Tag serves as an indirect pointer back to the request originator (e.g., 110).

Later when a completion message (114) comes back from Tree#2 (202), there will be a completer ID-Tag of similar structure on the external side of NtB 273 which identifies the Tree#2 completer. The nontransparent bridge 273 will logically associate that external-side, completer Tag with the earlier-saved, internal-side ID-Tag 257. As the NtB 273 translates border-crossing completion packets coming from Tree#2 (202) into packets that operate in Tree#1 (201), the NtB will use the index value 257c stored in the Function field of internal-side Tag 257 to fetch the correct ID-Tag for the request originator (i.e., CPU#1) and to stuff that correct ID-Tag into the originator-identifying areas 106 of the translated completion packets (114). The Tree#1 part of the communications network will use the index-fetched, correct ID-Tags to route the translated completion packets to the correct request originator (i.e., CPU#1).

Figure 3A:
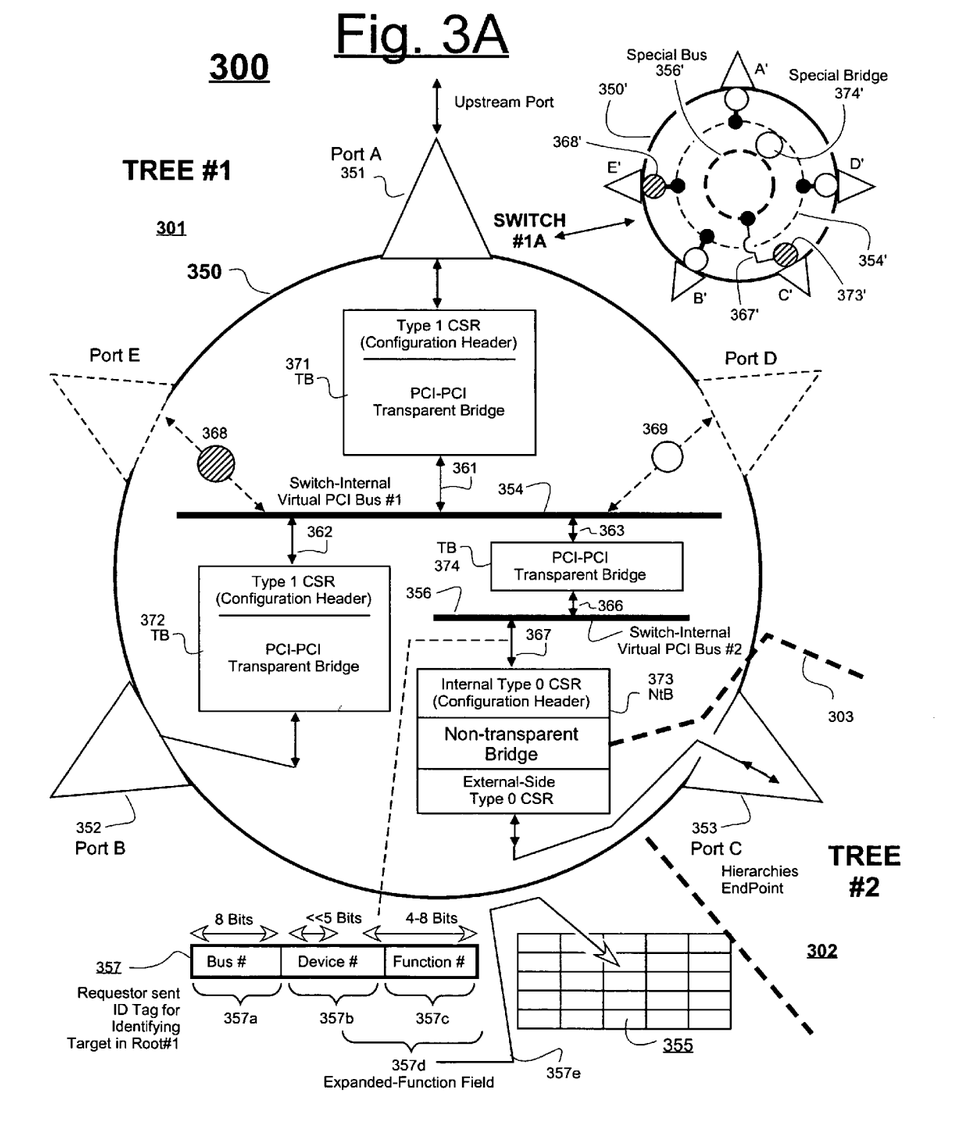
FIG. 3A is a schematic diagram showing a PCI-Express compatible switch in accordance with the invention that includes two or more, internal virtual buses where at least one of those buses is a special bus limited to having 16 or less devices on it.

Referring to FIG. 3A a novel type of PCI-express compatible switch 350 in accordance with the invention is illustrated. Where practical like reference numbers in the "300" century series are used for elements having corresponding counterparts references in the "200" century series as used in FIG. 2. Given this, aspects which are similar will not be described a second time. In one embodiment, switch 350 is implemented as a monolithic integrated circuit or part of such an IC. One significant difference between the switch 350 of FIG. 3A and the conventional switch 250 of FIG. 2 is that the novel switch 350 includes a second virtual PCI bus 356 and a transparent bridge 374 coupling the primary virtual bus 354 to the second virtual bus 356. The second virtual PCI bus 356 then couples to a nontransparent bridge 373 whose external side (foreign side) connects to a PCI-Express serial output port C (353). These basic differences between FIG. 3A and FIG. 2 are perhaps more easily seen by comparing the smaller sized iconic representations in the upper right corners of the respective figures. As seen by comparing schematic icon 350' (FIG. 3A) against schematic icon 250' (FIG. 2), the transparent bridge 374' which provides a path from conventional bus 354' to special PCI virtual bus 356' is new, as is the special bus 356' itself and the path 367' which PCI packets must follow when passing through nontransparent bridge 373'.

For purpose of explanation, bridge 368' (Port E) is now shown as being a nontransparent bridge (NtB) rather than the transparent bridge 268 shown in FIG. 2, meaning that bridge 368' must be counted as a device residing on primary bus 354' during enumeration of Root#1. If desired, item 268 of FIG. 2 could have also been a nontransparent bridge (NtB). It was shown as a transparent bridge in order to simplify the explanation of FIG. 2. However in FIG. 3A, it is better for purposes of explanation to consider item 368' as an endpoint device on primary bus 354'. Primary bus 354' can theoretically have a greater number of such endpoint devices residing on it (up to 32 maximum).

By contrast, the number of devices which may reside on special bus 356' is intentionally limited in accordance with the invention to a number that is 16 or less ($2^4$ or less). In one class of embodiments, the limiting number is set at 8 or less ($2^3$ or less). In another class of embodiments, the limiting number is set at 4 or less ($2^2$ or less). In yet another class of embodiments, the limiting number is set at 2. In the illustrated embodiment 300, the number of devices which may reside on special bus 356' is limited to just one such device ($2^0$ equals one), namely just nontransparent bridge (NtB) 373'. Transparent bridge (TB) 374' is unique because it links from the primary outer bus 354' to a new special bus 356' rather than linking to an output port such as was conventional in earlier PCI-express switches. Although FIG. 3A shows only one such special transparent bridge (TB) 374' creating a path to just one special bus 356', it is within the contemplation of the invention to have numerous such special bridges like 374' each providing a pathway to a corresponding special bus like 356' within a PCI-compatible switch. (See briefly FIG. 4A.) In one class of embodiments switch devices such as 350 (FIG. 3A) and 450 (FIG. 4A) are respectively incorporated within corresponding monolithic integrated circuit chips and are operatively coupled into a multi-domain networked system similar to the system 100 shown in FIG. 1. The inclusion of the so-called, special buses in these switches 350/450 allows for expansion of cross-domain addressing for PCI-Express packets, as will now become clear.

Because the number of devices allowed on special bus 356' (or 356 in the main part of FIG. 3A) is forced to be 16 or less, the number of bits needed in the Device field 357b of ID tag 357 for identifying targeted devices on this special PCI bus 356 (356') is less than 5 bits. Accordingly, one or more bits from the conventional, 5-bit wide Device field 357b can be combined with the conventional 3-bits of the Function field 357c to thereby define an expanded-Function field 357d having 4 or more bits. The digital value stored in the expanded-Function field 357d can then define an index 357e pointing to one of more than 8 registers in memory area 355, i.e. registers that store ID-Tags which then point to more than 8 request originators within the Root#1 tree (301). In the illustrated embodiment of FIG. 3A where there is just one enumerable device (NtB 373) on the special bus 356, all 5 Device field bits (355b) may be donated for use as part of the expanded-Function field 357d, thereby creating an expanded-Function field 357d having 8 bits. The 8 bits of this expanded-Function field may then be used for various purposes, including allowing as many as 256 devices to in the Root#1 tree to be designated as request originators for cross-border split transactions that are routed to over-the-fence completer devices in the second PCI Express tree 302. This is a substantially greater number than could have been addressed with the convention 3-bit Function field of FIG. 2 (as shown in ID tag 257). To reiterate, a novel PCI-express switching method is therefore disclosed here wherein at least one PCI-express compatible bus (e.g., 356) is forced (e.g., by software definitions) to have 16 or fewer enumerable devices residing on it, and at least one of those limited number of enumerable devices is a nontransparent bridge (e.g., NtB 373) that serves as a pathway between different domains (e.g., 301 and 302). A novel PCI-express switch is also disclosed that has two or more internal, PCI virtual buses where at least one of the internal virtual buses is a special bus that is limited to having 16 or fewer enumerable devices on it, thereby limiting the number of bits needed to uniquely specify the 16 or fewer devices on that special bus to 4 or fewer addressing bits (where the number of addressing bits can be 0 if only one enumerable device is allowed on the special bus).

Figure 3B:
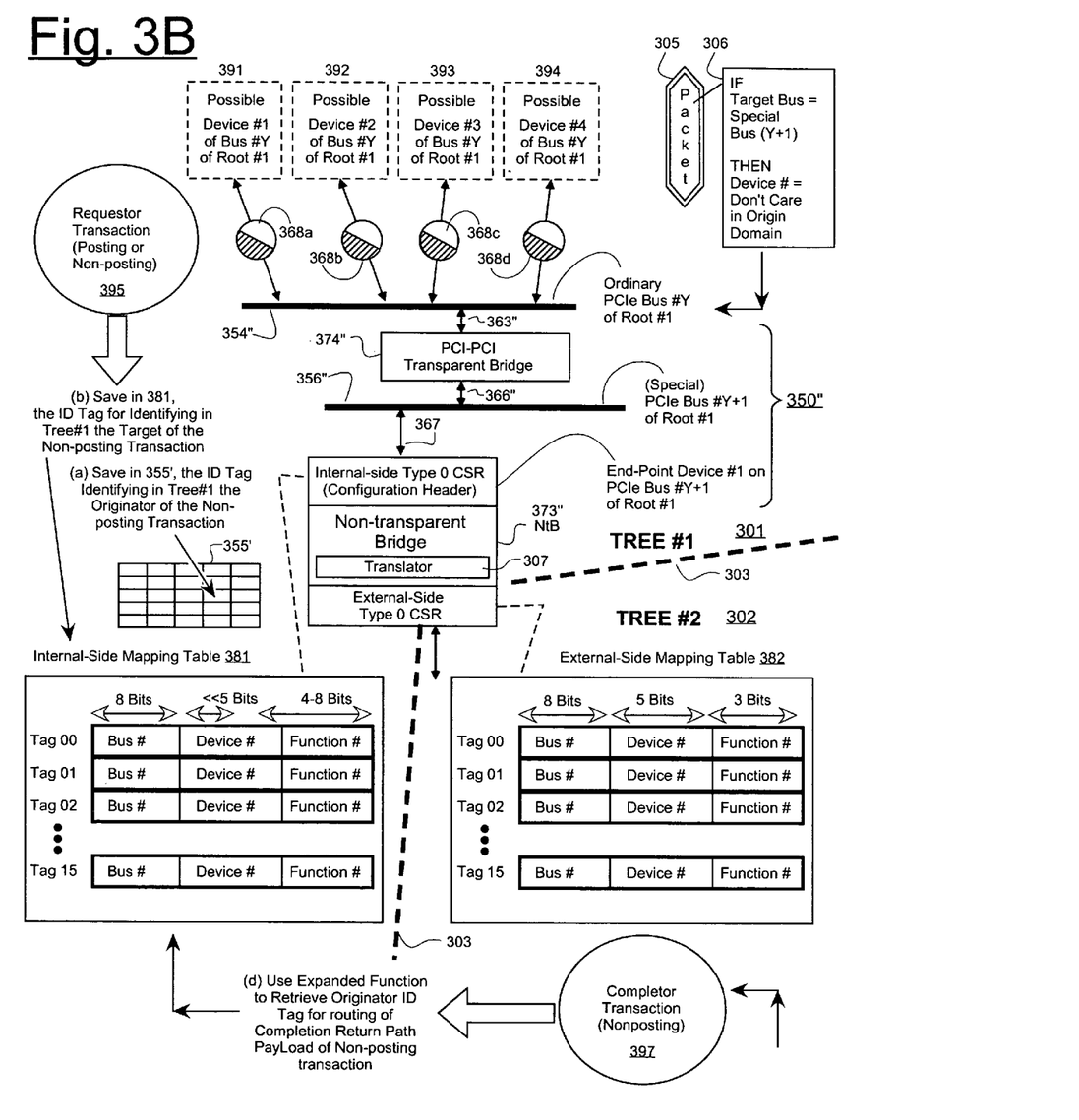
FIG. 3B is a combined schematic and flow chart for illustrating how completion transaction packets return through the non-Transparent bridge of the special virtual bus shown in FIG. 3A.

Referring to FIG. 3B, a closer look is taken as to how the special bus 356" is treated during device enumeration and later during transaction posting. Primary bus 354" is disposed within Root#1 (region 301) at a position downstream of the root node of the Root#1 tree. Special bus 356" is also disposed within Root#1 but at a position that is yet further downstream. Accordingly, during enumeration, the primary bus 354" will be assigned some bus number, #Y and the special bus 356" will be assigned a different value, say, #Y+1. The value of the latter #Y+1 bus number does not necessarily have to be 1 beyond the value of bus number #Y. This nomenclature is simply used here to indicate the succession of bus number assignments. Endpoint devices that are found on primary bus 354" may be assigned successive device numbers along that bus #Y. Thus, if any of the switch internal bridges 368a, 368b, 368c, and 368d is a nontransparent bridge (NtB) rather than a conventional transparent bridge, those nontransparent bridges will be enumerated respectively as Device#1 of Bus#Y of Root#1, then Device#2 of Bus#Y of Root#1, and so forth. By contrast, there will be only one enumerable device on special bus 356" (PCI Bus#{Y+1}) and that one endpoint device (NtB 373") will be enumerated respectively as Device#1 of Bus#(Y+1) of Root#1. The device number will be superfluous because the mere identification of Bus#(Y+1) will inherently point to the only endpoint device on Bus#(Y+1). (Note: Although the successive assignment of bus numbers to devices along each bus have been described thus far as being in the range 1-32, if strict Boolean enumeration is used, the range can be equivalently defined as 00-31 or $00_{hex}$–$1F_{hex}$. Under the latter notation, NtB 373" would be designated as Device#0 of Bus#(Y+1) of Root#1.)

In view of the above, consider now the situation where a first signal 395, that is requesting a cross-border split transaction, is moving downstream through the Root#1 tree, towards nontransparent bridge 373". Because the Root#1 target ID within this Root#1-originated signal 395 is pointing to NtB 373" and because it is sufficient to identify that particular endpoint device solely by its special bus number, #Y+1; the 5 bits in the associated Device-number field can be treated as don't care bits. Accordingly, up to 5 bits of the Device number field may be donated for use as part of an expanded-Function field whenever NtB 373" is being addressed from within its own root domain (Root#1). The combination of the 5 freed Device field bits and the original 3 Function field bits allows for an index value (357e) that that identifies any one of 256 locations in the switch memory 355'. At some point during network initialization, more than 8; and as many as 256 of these locations are pre-loaded with a corresponding number of bus and device numbers for a corresponding plural number of Root#1 devices that can act as request originators for cross-border split transactions. This pre-loading of the switch memory 355' is designated as a step (a) within FIG. 3B.

In FIG. 3B, a given packet 305 of the cross-border request signal 395 is understood to be traveling downstream within Root#1, first through primary bus 354", then through the special transparent bridge 374", and then through the special, PCI bus 356" to get to the internal side (domestic side) of nontransparent bridge (NtB) 373". The switch 350" is programmed to execute a special routing algorithm 306 in connection with this downstream-movement of packet 305. The special routing algorithm 306 essentially says: IF the Root#1 target bus is special Bus(Y+1), THEN the bits in the Device number field of the corresponding ID tag are don't care bits; they are assumed to be invalid with respect to identifying a target device in the originator's domain (Root#1) and they are ignored. Instead they can be used as indirect pointers back to the Root#1 originator (e.g., CPU#1 of FIG. 1). In a transaction processing step designated as a step (b) within FIG. 3B, the 5-bits of the Device field are stored together with the 3-bits from the Function field obtained from the Root#1 ID-Tag of packet 305 in an internal-side mapping table 381 of the switch 350. Later, when a completer packet 397 comes back in the reverse direction across the border 303, the switch software (not explicitly shown) will fetch the stored, 8-bit index value from the internal-side mapping table 381 and use it as an index into memory area 355' for retrieving the ID-Tag of the correct originator. This fetched ID-Tag will be written into the transaction originator's field (106 of FIG. 1) of return packets as they cross into the Root#1 domain. Once inside the Root#1 domain 301, the fetched ID-Tags may be used to correctly route the translated completion packets (e.g., 397) to the correct originator of the cross-border split transaction request (395). The fetching of the ID-Tag of the correct originator is designated as a step (d) within FIG. 3B. Although not shown, the intermediate step (c) between the (b) and (d) steps would include the forward translation of the request packets (395) as they cross the border 303 in the forward direction and the waiting for the completion packets 397 to come back in the reverse direction.

From a broader perspective, FIG. 3B may be seen as showing a PCI-express compatible switch that has at least two virtual buses (354", 356") and at least one nontransparent bridge (373") residing on the special one of the virtual buses, where the switch further has a special packet routing means (306) for routing packets to the at least one nontransparent bridge (373") and where the packet routing means includes a programmable, Device-bits ignoring means for ignoring one or more bits of a Device-number field of the destination-specifying ID tag (107), thereby allowing the ignored one or more bits of the destination-specifying Device-number field to be used for other purposes, such as, for specifying a location in memory 355 that stores the Root#1-valid, bus and device numbers of the request originator (e.g., CPU#1).

Besides the don't care routing operation indicated at 306, the illustrated switch 350" is further programmed to execute a special translating algorithm 307 within the nontransparent bridge 373". That special translating algorithm 307 is structured to treat the combined 5 don't-care bits of the ID-Tag stored in table 381 (e.g., as Tag 02 for example) as an extension of, or as a substitute for, the 3 bits in the associated Function field. The translating algorithm 307 uses bits within the expanded Function field to generate the index that identifies one of up to as many as 256 unique memory locations in memory region 355'. All or a subset of the 256 unique memory locations may be used as storage locations for the correct bus and device numbers of a corresponding number of Root#1 devices that are permitted to act as request originators for cross-border split transactions. Thus, fence-crossing split transactions such as 395 may be originated from any one of up to 256 different devices in the Root#1 tree. The freed up device bits may be used to specify other functions besides that of identifying the correct, domestic side, originators. In view of this, FIG. 3B may be seen as showing the PCI-express compatible switch that has a programmable translating means (307) for translating the ignored one or more bits of the destination-specifying Device-number field (where the destination is in Root#1) into a specification to be used by an alternate function other than specifying the Root#1 destination.

When the transaction completion packets 397 come back in the upstream direction, moving from Root#2 into NtB 373", the completion packets 397 will initially indicate that one of the ID-Tags in the external side mapping table 382 represents the request originator. A predefined logical association between the internal-side and external side mapping tables 381-382 of NtB 373" will be used by switch software to point to the corresponding entry in the internal-side mapping table 381 (e.g., Tag 02) that holds the 4-bit or longer index value pointing to the bus and device numbers of the true originator in Tree#1. The true bus and device numbers will written into the translated completion packets before they enter the Root#1 tree 301. Thus the translated completion packets (397) will revert back to the addressing scheme used in the requester-side domain.

Figure 4A:
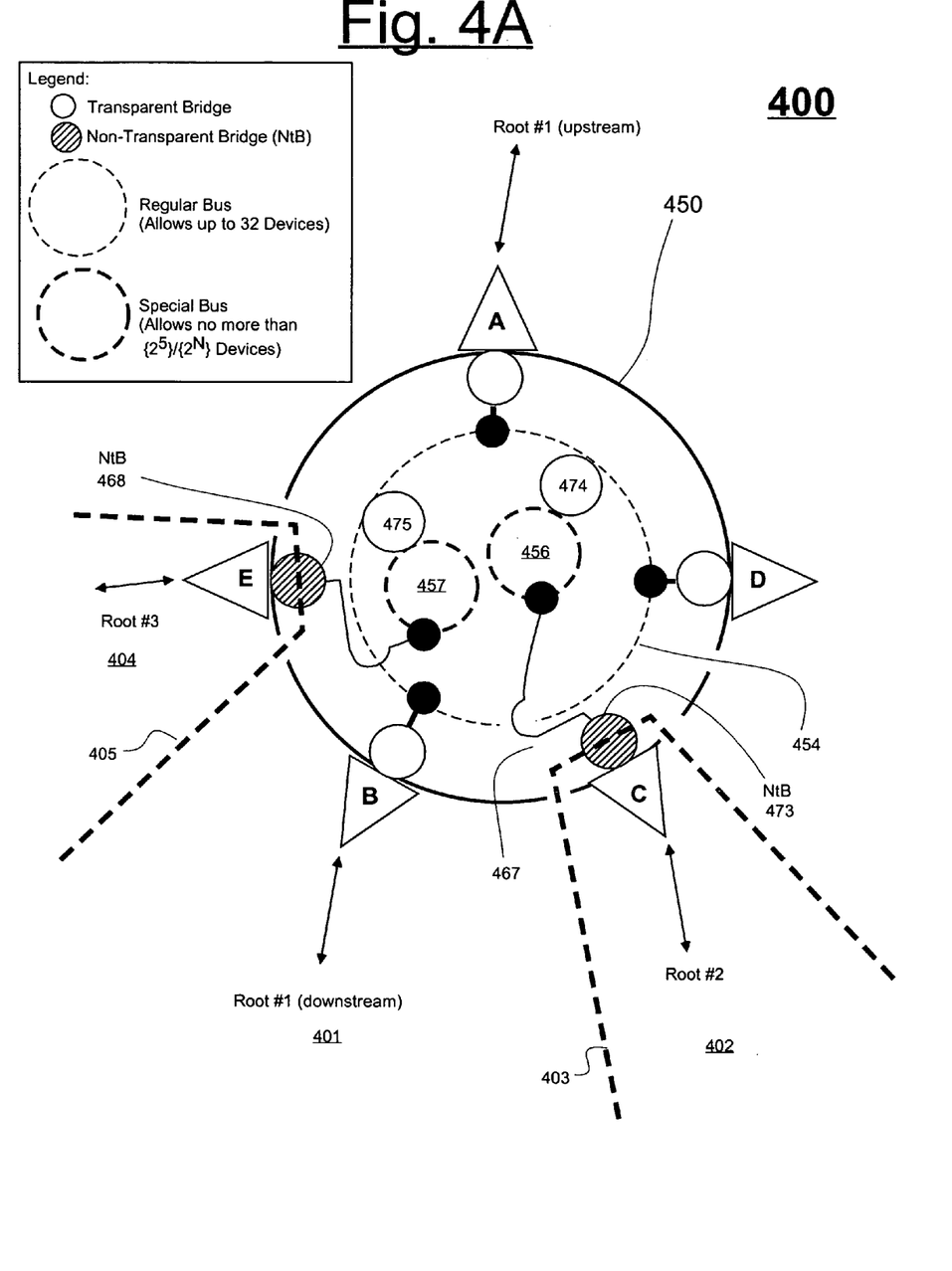
FIG. 4A is a schematic diagram showing a second PCI-Express compatible switch in accordance with the invention that includes three or more, internal virtual buses where at least two of those buses are special buses each limited to having 16 or less devices on it.

Referring to FIG. 4A, yet another switch 450 in accordance with the invention is shown. This switch 450 sports two separate special buses 456 and 457 respectively coupling to non-transparent bridges 473 and 468. Nontransparent bridge (NtB) 473 couples to the Root#2 domain (402) while nontransparent bridge (NtB) 468 couples to a Root#3 domain (404). Port A is the upstream port for Root#1 (401) while illustrated Port B is an enumeration-wise downstream port for Root#1. Special bridges 474 and 475 respectively couple special buses 456 and 457 to the primary virtual bus 454. Signals may be routed along the primary virtual bus 454 so as to provide communication between any two of Ports A, B, C, D and E. As many as 256 request originators can send cross-border split transactions from Root#1 Port A to Root#2 Port C.

Figure 4B:
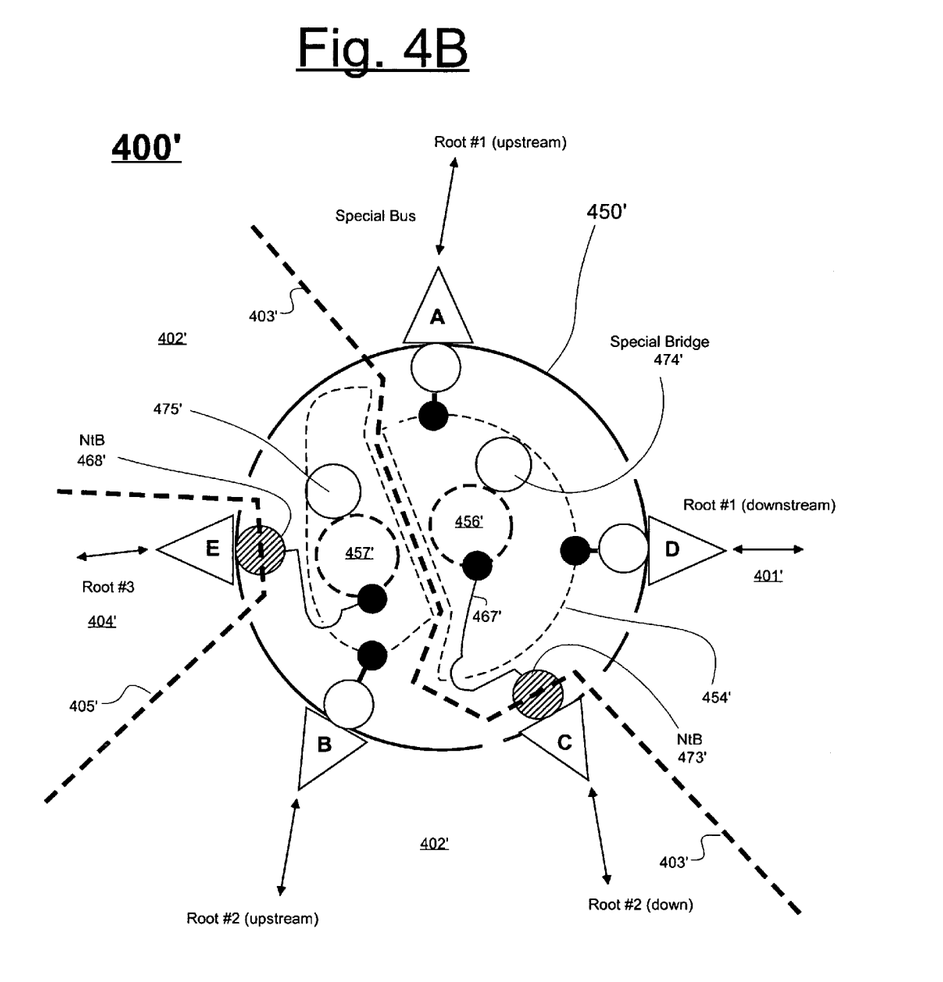
FIG. 4B is a schematic diagram showing a third PCI-Express compatible switch in accordance with the invention that includes a sufficient number of internal virtual buses to permit expanded, cross-border communications for at least two different domains.

Referring to FIG. 4B, yet a further switch 450' in accordance with the invention is shown. This switch 450' sports two separate, regular buses and two special buses, 456' and 457' respectively coupling to non-transparent bridges 473' and 468'. Nontransparent bridge (NtB) 473' couples to the Root#2 domain (402') while nontransparent bridge (NtB) 468' couples to a Root#3 domain (404'). Port A is the upstream port for Root#1 (401') while illustrated Port B is the upstream port for Root#2 (402'). As many as 256 request originators can send cross-border split transactions from Root#1 Port A to Root#2 Port C. As many as 256 other request originators can send cross-border split transactions from Root#2 Port B to Root#3 Port E. (If desired, Port E could have just as easily been made a part of Root#1.) Special bridges 474' and 475' respectively couple special buses 456' and 457' to the primary virtual buses of Port A and Port B.

It may be appreciated from FIGS. 4A-4B that a large number of special buses may be provided within any given PCI-compatible switch using the techniques disclosed herein. These special buses (each having 16 or fewer enumerable devices thereon) may be used to greatly expand the number request originators that are specifiable as being capable of issuing cross-border split transaction requests in a PCI express network.

While switches such as 350, 450 and 450' of respective FIGS. 3A-3B and 4A-4B have been presented thus far as though they have fixed architectures, it is within the contemplation of the disclosure to alternatively or additionally carry out the invention in switches that have programmably-definable architectures. Such switches may be PCI-X compatible or PCI-Express compatible. The PCI-X protocol allows for cross-border split transactions in a similar way to those used in PCI-Express. When switches with have programmably-definable architectures are used, it is possible to devise an N-port PCI-X or PCIe compatible switch where one or more of the N number of ports is programmably switchable between behaving as a conventional port (i.e. 352) having a transparent bridge (i.e. 372) and behaving as an unconventional port (i.e. 353) having a nontransparent bridge (i.e. 373) that is operatively coupled so as to be seen as residing on a special bus (i.e. 356). Thus, the present disclosure covers programmable PCI-compatible switches that can be programmably configured to have one or more special buses and a corresponding one or more nontransparent bridges residing on such special buses.

Figure 5:
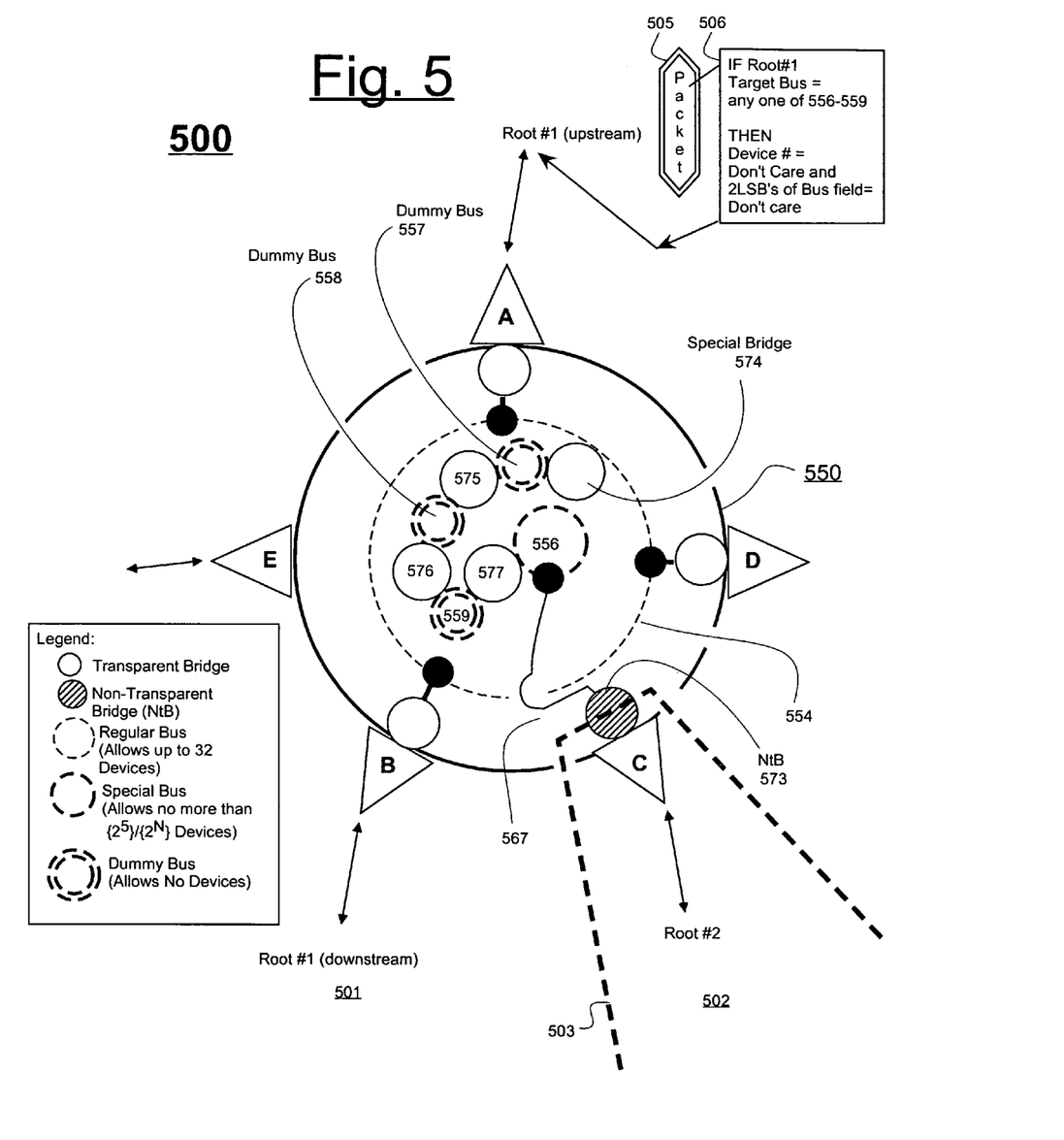
FIG. 5 is a schematic diagram showing a supplemental or alternate technique wherein one or more dummy buses are implemented inside a PCI-Express compatible switch so that a corresponding one or more bits of the Bus number field in the ID Tag become don't care bits in so far as identifying the NtB is concerned.

Referring to FIG. 5, yet another PCI-Express or PCI-X network 500 is shown in accordance with the invention to include a further modified switch 550 in accordance with the invention. Where practical like reference numbers in the "500" century series are used for elements having corresponding counterparts references in the "400" century series as used in FIGS. 4A-4B. Given this, aspects which are similar will not be described a second time. The main difference is that switch 550 includes a succession of 3 dummy buses: 557, 558 and 559 interposed between regular bus 554 and special bus 556. The 3 dummy buses connect one to the next and finally to special bus 556 by way of respective bridges 575, 576 and 577. Each dummy bus is characterized as having no addressable device on that bus. It is assumed that during bus enumeration, the successive dummy buses, 557, 558, 559, and then the special bus 556 will be successively enumerated Y+1, Y+2, Y+3 and Y+4, where Y is a bus number assigned by enumeration to the regular bus 554 that immediately precedes the succession of dummy buses. (For example, if Y=0010 in binary, then Y+1=0011, Y+2=0100, Y+3=0101 and Y+4=0110, each expressed in binary.)

The software 506 in switch 550 is configured to route a packet 505 to NtB 573 if the target-identifying ID-Tag specifies any one of buses 556, 557, 558 and 559. Thus the two least significant bits (LSB's) of the Bus number field (see 357a) become Don't Care bits in so far as routing a packet to NtB 573 is concerned. The 2 LSB's of the Bus number field may be combined with 3-bit Function field to define an expanded index-holding field (see 357d) or the 2 LSB's of the Bus number field may be combined with one or both of the 5-bit Device field and 3-bit Function field to define an expanded index-holding field. Although 3 successive dummy buses: 557, 558 and 559, are used in FIG. 5, this is merely for purpose of illustration. A mere one dummy bus (i.e. 557) could have instead been interposed between regular bus 554 and special bus 556. In such a, one-dummy alternative, the software 506 in switch 550 would have been configured to route a packet 505 to NtB 573 if the target-identifying ID-Tag specifies any one of special bus 556 and dummy bus 557. This would render the one, least significant bit (LSB) of the Bus number field (see 357a) as being a Don't Care bit in so far as routing a request packet to NtB 573 is concerned. The so-freed LSB of the Bus number field may then be used to form an expanded index-holding field (see 357d) in combination with either one or both of the 3-bit Function field and one or more freed bits of the Device field. The so-expanded index-holding field may then be used to reference one of more than 8 request originators in the process of translating a completer packet during a cross-border split transaction. In the example shown at 506 of FIG. 5, it is assumed that all 5 bits of the Device field have been freed per the above disclosure for forming the expanded index-holding field and the 2 LSB's of the Bus field have been freed by using the dummy bus technique. Thus there is a total of 10 bits for specifying a respective one of 1024 possible request originators in the Root#1 domain under the example shown in FIG. 5.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example of a possible variation, although the disclosure shows NtB's as residing at the peripheries of switches, and domain boundaries being also located at such peripheries, this is not a requirement. Domain boundaries can cross through an internal part of a switch and the NtB can be an internal one bridging between two switch-internal buses where the buses belong to different domains.

By way of a second example of a possible variation, although the disclosure has been directed to the currently existing PCI-Express protocol wherein the maximum number of addressable devices per PCI bus is specified by protocol to 32, it is within the contemplation of the invention that future protocols may specify a larger maximum number of allowed devices per bus, say 64 or 128. The concepts of the invention may nonetheless be applied by providing special buses that have additional limitations imposed on them beyond the protocol specification, where the additional limitations include having an extra-protocol limitation on the number of allowed devices on the special buses, that extra-protocol number being equal to no more than ½ raised to a whole number, K times the protocol-defined maximum number (say 32 or 16 where the protocol's maximum number is 64). This beyond-protocol restriction will free up K bits for use as index bits or otherwise.

Reservation Of Extra-Patent Rights, Resolution Of Conflicts, and Interpretation Of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A packet routing switch that is adapted for use in communications network having a predefined communications protocol which specifies for protocol compliant devices, that completer packets of a split transaction are to use bus and device number addressing when routing back to a corresponding request originator, the switch being protocol-compliant, having a Non-Transparent Bridge (NtB) and further comprising:
   (a) two or more internal virtual buses where at least one of said internal virtual buses is a special bus that is coupled to the NtB and that is limited to having no more than a protocol-specified maximum number of addressable devices allowed per protocol compliant bus multiplied by ½ raised to a whole number power, K, thereby limiting a number of bits needed for uniquely addressing devices on said at least one special bus to fewer than a protocol-specified number of bits needed for uniquely addressing the protocol-specified maximum number of addressable devices allowed per protocol compliant bus.

2. The packet routing switch of claim 1 wherein:
   (a.1) said at least one special bus is limited to having no more than one fourth of said protocol-specified maximum number of addressable devices residing on said at least one special bus.

3. The packet routing switch of claim 1 wherein:
   (a.1) said at least one special bus is limited to having no more than one sixteenth of said protocol-specified maximum number of addressable devices residing on said at least one special bus.

4. The packet routing switch of claim 1 wherein:
   (a.1) said at least one special bus is limited to having only one addressable device residing on said at least one special bus and the one addressable device is said nontransparent bridge.

5. The packet routing switch of claim 1 wherein said NtB constitutes at least one of one or more nontransparent bridges residing on said at least one special bus, the packet routing switch further comprising:
   (b) packet routing means for routing split transaction request packets to the at least one nontransparent bridge on said at least one special bus and for routing split transaction completion packets from the at least one nontransparent bridge, where the packet routing means includes index generating means which uses one or more bits of a Device-number field of a destination-specifying ID tag corresponding to a received completion packet to generate an index pointing to at least one of a bus number and device number of a return device to which the received completion packet should be routed.

6. The packet routing switch of claim 1 wherein:
   said predefined communications protocol is serial packet transmission protocol.

7. The packet routing switch of claim 1 wherein:
   said predefined communications protocol is a PCI-Express serial packet transmission protocol.

8. The packet routing switch of claim 1 wherein:
   said switch has at least three ports.

9. The packet routing switch of claim 1 wherein:
   said two or more internal virtual buses and the NtB are implemented within a monolithic integrated circuit.

10. A packet routing switch that is adapted for use in communications network having a predefined communications protocol which specifies for protocol compliant devices, that completer packets of a split transaction are to use bus and device number addressing when routing back to a corresponding request originator, the switch being protocol-compliant, having a Non-Transparent Bridge (NtB) and further comprising:

(a) two or more internal virtual buses successively bridged one to the next where at least a first of said internal virtual buses is a dummy bus limited to having no addressable devices residing thereon, thereby reducing a number of bus-addressing bits needed for routing packets to a subsequent second of said successively bridged internal virtual buses.

11. A multi-domain network having a plurality of root hosts each hosting a respective root tree, where at least two of the trees include PCI-Express links and where respective first and second PCI-Express links of the at least two trees are joined by a PCI-express compatible switch and where said PCI-express compatible switch comprises:

(a) two or more internal virtual buses where at least one of said internal virtual buses is a special bus having 16 or fewer addressable devices residing thereon, thereby limiting a number of bits needed for uniquely specifying said 16 or fewer devices to 4 or less bits and where the special bus has at least one nontransparent bridge (NtB) residing thereon.

12. The multi-domain network of claim 11 and where said PCI-express compatible switch further comprises:

(b) packet routing means for routing transaction request packets to the at least one nontransparent bridge on said at least one special bus and for routing transaction completion packets if any away from the at least one nontransparent bridge, where the packet routing means includes index generating means which uses one or more bits of a Device-number field of a destination-specifying ID tag corresponding to a received completion packet to generate an index pointing to at least one of a bus number and device number of a return device to which the received completion packet should be routed.

* * * * *